United States Patent [19]

Hiza et al.

[11] Patent Number: 4,654,382

[45] Date of Patent: Mar. 31, 1987

[54] ADHESIVE COMPOSITIONS

[75] Inventors: Misao Hiza, Hiratsuka; Hajime Yamazaki, Hadano; Shigeo Omote, Hiratsuka, all of Japan

[73] Assignee: The Yokohama Rubber Co., Ltd., Shimbashi, Japan

[21] Appl. No.: 738,088

[22] Filed: May 24, 1985

[30] Foreign Application Priority Data

Jun. 8, 1984 [JP] Japan ................................. 59-116600
Jun. 8, 1984 [JP] Japan ................................. 59-116604

[51] Int. Cl.$^4$ ....................... C08G 59/32; C08G 59/56
[52] U.S. Cl. .................................... 523/457; 523/440;
523/442; 523/443; 523/444; 523/458; 523/466;
525/502; 528/27; 528/98; 156/330
[58] Field of Search ................ 525/449, 504, 502;
528/98, 27, 104, 103; 523/457, 458, 466, 440,
442, 443, 444

[56] References Cited

U.S. PATENT DOCUMENTS

| | | | |
|---|---|---|---|
| 3,370,038 | 2/1968 | Barton et al. | 528/98 |
| 3,483,164 | 12/1969 | Barton et al. | 528/98 |
| 3,787,451 | 1/1974 | Mah | 528/98 X |
| 4,394,496 | 7/1983 | Schrader | 528/98 |

FOREIGN PATENT DOCUMENTS 788556  1/1958  United Kingdom ................ 528/98

Primary Examiner—Earl Nielsen
Attorney, Agent, or Firm—Bucknam and Archer

[57] ABSTRACT

An adhesive composition comprising, by weight, (1) 100 parts of triglycidyl ether of trisphenol, (2) 0–40 parts of a polyfunctional epoxy resin, (3) a diamine type curing agent selected from (a) an aromatic diamine compound and (b) a reaction product having an amino group at each terminal thereof, prepared by reacting together an aromatic diamine compound, divinylsilane compound and bismaleimide compound, and, if desired, (4) a powdery inorganic filler.

8 Claims, 1 Drawing Figure

ADHESIVE COMPOSITIONS

BACKGROUND OF THE INVENTION

1. Field of the Invention

This invention relates to a heat resistant adhesive composition and more particularly to a heat resistant, epoxy resin-based adhesive composition which is satisfactory in operativeness and workability and will retain its high adhesive strength even at a high temperature of 150° to 250° C. or higher after it is cured.

2. Prior Art

Epoxy resin-based resins using aromatic diamines or the like as curing agents have heretofore been widely known as adhesives having excellent heat resistance. However, they are not necessarily satisfactory with respect to adhesiveness at high temperatures.

On the other hand, other heat resistant adhesives which have been well known, include polyamide-based, polyamideimide-based and polybenzimidazole-based adhesives. However, they raise problems from the viewpoint of practical use for the following reasons:

−1. Almost all of these adhesives are solvent type adhesives containing high boiling solvents and they therefore need a step of removing the solvent at high temperatures.

2. The uniformity of cured adhesive layers is not always assured since the original adhesives produce by-products such as water when they are cured.

3. The procedure of adhesion using the adhesives is complicated and, in addition, the temperature necessary for adhesion using them is as very high as at least 250° C.

4. The adhesive strength obtained is low.

The known epoxy resin-based adhesives have been used as those having comparatively high heat resistance, however, satisfactory adhesive strength is not obtained at the present with them at a temperature of 150° C. or higher even if they are varied in resin structure or the curing agents used are varied in kind.

Recently, new heat resistant resins have been developed and have partly been studied in attempts to use them as adhesives. Among the new resins is an epoxy resin prepared from triglycidyl ether of trisphenol. The epoxy resin so prepared has, per se, considerably satisfactory heat resistance in a high-temperature region at 150°–250° C., but it will decrease in adhesive strength when it is subjected to impact or shearing force under heat, this proving that it has unsatisfactory adhesive strength.

Therefore, it is a general object of this invention to overcome the disadvantages described hereinbefore.

It is a further object of this invention to provide an adhesive composition which dispenses with a solvent, achieves adhesion using a simplified procedure from the viewpoint of improvement in operativeness and workability and can be used as an adhesive particularly at the site where heat resistance is required.

These and other objects will be apparent from the following description.

SUMMARY OF THE INVENTION

The objects of this invention may be achieved by mixing together (1) 100 parts by weight of a triglycidyl ether of trisphenol, (2) 0–40, preferably 2–40, parts by weight of a polyfunctional epoxy resin, (3) a specific amount by weight of a diamine type curing agent selected from (a) an aromatic diamine compound and (b) a reaction product having an amino group at each terminal thereof, prepared by reacting together an aromatic diamine compound, a divinylsilane compound and a bismaleimide compound, and, if desired, (4) 0–200, preferably 30–100, parts by weight of a powdery inorganic filler of 0.1 mμ to 150μ in average particle size per 100 parts by weight of a total of said ingredients (1) to (3), thereby to form a heat resistant adhesive composition.

The triglycidyl ethers of trisphenol used in this invention include tris(4-glycidoxyphenyl)methane, 1,1,2-tris(4-glycidoxyphenyl)ethane and 1,1,3-tris(4-glycidoxyphenyl)propane.

The polyfunctional epoxy resins used in this invention are not particularly limited, but it is preferable that they have at least 3 functional groups, particularly oxirane groups, in the molecule. The preferable epoxy resins include novolak type epoxy resins typified by ESCN 220 (trademark; produced by Sumitomo Chemical Industrial Co.) and EPIKOTE 154 (trademark; functional groups, 3.7; produced by Shell Chemical Co.), and heterocyclic ring-containing epoxy resins exemplified by nitrogen-containing epoxy resins such as TEPIC (trademark; produced by Nissan Chemical Industrial Co.) and ELM 434 (trademark; produced by Sumitomo Chemical Industrial Co.). The epoxy resins having at least 3 functional groups may be used singly or in combination. The non-use of these epoxy resins in the adhesive composition will result in a decrease in adhesive strength, whereas the use of more than 40 parts by weight thereof will raise a problem as to heat resistance, with the result that the adhesive strength at high temperatures is lowered. It is preferable that such epoxy resins be used in amounts of 2–40 parts by weight.

The aromatic diamine compounds (3)(a) used in this invention include 4,4'-diaminodiphenylmethane, 4,4'-diaminodiphenylpropane, benzidine, 3,3-dichlorobenzidine, 4,4'-diphenylsulfide, 3,3'-dichloro-4,4'-diaminodiphenylmethane, 4,4'-diaminodiphenyl ether, 4,4'-diaminodiphenylsulfone, 1,5-diaminonaphthalenemetaphenylenediamine, paraphenylenediamine, metaphenylenediamine, paraxylylenediamine, metaxylylenediamine and 4,4'-bis(paraaminophenoxy)diphenylsulfone.

The amount of the aromatic diamine (3)(a) used in the adhesive composition of this invention is such that the ratio of the amine equivalent to the epoxy equivalent is in the range of from 0.5 to 1.5. In a case where the ratio is less than 0.5 or more than 1.5, the adhesive strength to be obtained will undesirably decrease.

The reaction product (3)(b) alternatively used in the adhesive composition of this invention is prepared by reacting together an aromatic diamine compound, a divinylsilane compound and a bismaleimide compound as the essential reactants, and has an amino group at each terminal thereof. The aromatic diamine compounds used as one of the essential reactants in the preparation of the reaction product (3)(b), may be the same as those (3)(a). The divinylsilane compounds used herein include 1,3-divinyltetramethyldisiloxane, 1,3-divinyltetraethoxydisiloxane and 1,3-divinyltetramethyldisiloxane. The bismaleimide compounds used herein are represented by the following formula

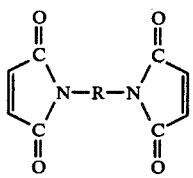

wherein R is an alkylene group, a cycloalkylene group or a divalent hydrocarbon radical in which two alkylene or cycloalkylene groups bonded to each other with a divalent atomic group such as —$CH_2$—, —CO—, —$SO_2$— or —CONH—, interposed therebetween. The bismaleimide compounds include N,N'-phenylenebismaleimide, N,N'-hexamethylenebismaleimide, N,N'-methylene-di-p-phenylenebismaleimide, N,N'-oxy-di-p-phenylenebismaleimide, N,N'-p-diphenylsulfonmaleimide, N,N'-(3,3'-dimethyl)-methylene-di-p-phenylenebismaleimide, N,N'-m(or p)-xylylenebismaleimide and N,N'-metatoluylenedimaleimide. In addition, monomaleimide compounds include N-allylmaleimide, N-phenylmaleimide and N-hexylmaleimide, and they may secondarily be additionally used.

The above-mentioned aromatic diamine compounds which are necessary as one kind of the essential starting materials for obtaining the reaction product (3)(b), may be used singly or jointly. The same is true of the other two kinds of the essential materials, which are the divinylsilane compounds and the bismaleimide compounds.

To obtain the desired reaction product (3)(b) from the aforesaid three kinds of the essential starting materials, these starting materials may be reacted together in a solvent or in bulk as mentioned later. The reaction product so obtained generally has a pour point of 70° C. or lower. The reaction product can therefore be mixed with the epoxy type resins (1) and (2) at low temperatures in a case where it is used as a curing agent for the resins, thus conducing to improvements in pot life and operativeness of the resulting adhesive composition, whereas the conventional diamine adducts of maleimide compounds require to be melted and mixed with such epoxy resins at high temperatures because of compatibility with each other in a case where the adducts are used as a curing agent for the epoxy resins, thus raising a problem as to pot life.

The mixing ratio of the total of the epoxy type resins (1) and (2) to the reaction product (curing agent) (3)(b) prepared by the three essential starting materials, may suitably vary depending on the use of the resulting adhesive composition and the heat resistance required therein. The amount of the reaction product (curing agent) used in the adhesive composition is generally determined as indicated below.

1. The amine equivalent of the reaction product (curing agent) is calculated as follows:

Amine equivalent =

$$\frac{\text{Total weight of three essential starting materials}}{\text{No. of active hydrogen atoms bonded to N atom}}$$

2. The amount of reaction product (3)(b) used per 100 parts of the epoxy type resins (1) and (2) in total is determined by the following formula:

Amount (parts by weight)=(Amine equivalent/Epoxy equivalent)×100×$\phi$ wherein $\phi$ is a coefficient, usually $0.5 \leq \phi \leq 2.0$.

The adhesive composition of this invention varies in viscosity depending on the aromatic diamine compound (curing agent) (3)(a) or reaction product (curing agent) (3)(b) selected and the mixing ratio of the epoxy type resins (1) and (2) total to the curing agent (3)(a) or (3)(b) and is obtained in the form of from solid to liquid at ambient temperature. Thus, the composition is very satisfactory as a non-solvent type adhesive. Further, the composition may also be used as a solvent-type adhesive since it is easily soluble in a low boiling solvent such as methyl ethyl ketone or dioxane.

In this invention, the adhesive composition may be incorporated, as required, with a boron trifluoride amine complex such as boron trifluoride monoethylamine, a tertiary amine such as 2,4,6-tris(dimethylaminomethyl)phenol, and an imidazole compound.

According to this invention, the adhesive composition may further be incorporated with a powdery inorganic filler (4) if desired. The fillers which may be used in this invention, include silica, quartz, glass powder, alumina, calcium silicate, talc, kaolin, aluminum powder and iron powder, and also include those having their surface treated with a silane coupling agent. The fillers should preferably have an average particle size in the range of 0.1 m$\mu$ to 150$\mu$. The use of such fillers having a particle size outside of the above range will result in a great decrease in adhesive strength with no adhesiveness-improving effect being appreciated.

The amount of powdery inorganic fillers (4) used in the adhesive composition of this invention is up to 200, preferably 30–100, parts by weight per 100 parts by weight of the total of the epoxy type resins (1), (2) and curing agent (3). The use of more than 200 parts by weight of the inorganic fillers will result in a decrease in adhesive strength with no adhesiveness-improving effect being appreciated.

The adhesive composition of this invention may still further be incorporated with other additives such as a reactive or non-reactive diluent and a colorant.

As is seen from the foregoing, the ingredients (1) to (4) used in the preparation of the adhesive composition of this invention are satisfactorily compatible with one another, and the adhesive composition so prepared will not produce any by-products such as water at the time of its cure thereby retaining the uniformity of the resulting cured adhesive layer and will exhibit excellent adhesion performance even at high temperatures thereby permitting it to be used as a suitable adhesive for effecting a heat resistant bond between materials.

Accordingly, the adhesive compositions of this invention find a wide use in the industrial fields of aircraft, automobiles, machinery, electricity and electronics, railway, shipping, vehicles, architecture and the like. They may be used in place of spot welding, melt welding and bolting.

DESCRIPTION OF THE PREFERRED EMBODIMENTS

Figure 1:
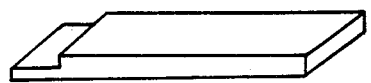
FIG. 1 is a perspective view showing one of to-be-bonded test iron plates which were used in a test for evaluation of adhesive strength.

This invention will be better understood by the following Examples and Comparative Examples, wherein all parts are by weight unless otherwise specified.

EXAMPLE 1

A four-necked separable flask provided with a stirrer, thermometer and reflux condenser, was charged with 100 parts of tris(4-glycidoxyphenyl)methane (epoxy equivalent, 163; No. of epoxy functional groups, about 3; produced under the trademark of XD-7342.00L by Dow Chemical Co.) and 25 parts of a novolak type epoxy resin (epoxy equivalent, 222.1; molecular weight, 1600; No. of epoxy functional groups, 7.2; produced under the trademark of ESCN 220HH by Sumitomo Chemical Industrial Co.), after which the resulting mixture was heated to 150° C. in an oil bath while purging with nitrogen. After confirming that the mixture was in the completely molten state, 50 parts of 4,4'-diaminodiphenylsulfone (produced under the trademark of SUMICURE S by Sumitomo Chemical Industrial Co.) were added to the mixture and the whole was then continuously stirred until it was completely melted. After the whole was entirely melted and became transparent, 75 parts of aluminum powder (average particle size, 44μ) were added to and then dispersed under thorough stirring in said entirely melted material thereby to obtain an epoxy type adhesive composition. The epoxy type adhesive composition so obtained was measured for adhesive strength (tensile shearing strength) at 25° C. and at 250° C. and was evaluated for strength retentivity. The retentivities of more than 70% are assumed herein to indicate satisfactory heat resistance. The results obtained are as shown in Table 1. The measurement for tensile shearing strength was made in accordance with the following method.

Iron plates one of which is shown in FIG. 1 were subjected to sand blast and then used as test pieces having at one end a recessed portion (12.5 mm×25 mm) to which the adhesive composition was to be applied. The adhesive composition was applied to the recessed portion of each of the test pieces, after which the test pieces were bonded to each other, in such a manner that the adhesive composition-applied recessed portions overlapped, face to face, each other and then treated to cure the applied adhesive composition at 200° C. for 2 hours. The test pieces so bonded together were then measured at a pulling velocity of 5 mm/min. for the tensile shearing strength of the cured adhesive composition.

EXAMPLE 2

100 parts of tris(4-glycidoxyphenyl)methane (epoxy equivalent, 163; No. of epoxy functional groups, about 3; trademark, XD-7342.00L), 25 parts of a nitrogen-containing epoxy resin (epoxy equivalent, 110–130; No. of epoxy functional groups, about 4; produced under the trademark of ELM 434 by Sumitomo Chemical Industrial Co.), 50 parts of 4,4'-diaminodiphenylsulfone (trademark, SUMICURE S) and 75 parts of aluminum powder (average particle size, 44μ), were mixed together and treated in the same manner as in Example 1 thereto to obtain an adhesive composition. The composition so obtained was then evaluated for adhesive strength in the same manner as in Example 1. The results obtained are as indicated in Table 1.

EXAMPLE 3

100 parts of tris(4-glycidoxyphenyl)methane (epoxy equivalent, 163; No. of epoxy functional groups, about 3; trademark, XD-7342.00L), 25 parts of a novolak type epoxy resin (epoxy equivalent, 222.1; molecular weight, 1600; No. of epoxy functional groups, 7.3; trademark, ESCN 220HH), 50 parts of 4,4'-diaminodiphenylsulfone (SUMICURE S) and 75 parts of quartz powder treated with an epoxy group-containing coupling agent (trademark, CRS 1101-17; particle size, 40–50μ; produced by Tatsumori Co.), were mixed together and treated in the same manner as in Example 1 thereby to obtain an adhesive composition which was then evaluated for adhesive strength in the same manner as in Example 1. The results obtained are as shown in Table 1.

EXAMPLE 4

100 parts of tris(4-glycidoxyphenyl)methane (epoxy equivalent, 163; No. of epoxy functional groups, about 3; trademark, XD-7342.00L), 25 parts of a novolak type epoxy resin (epoxy equivalent, 222.1; molecular weight, 1600; No. of epoxy functional groups, 7.3; trademark, ESCN 220HH), 30 parts of 4,4'-diaminodiphenylsulfone (SUMICURE S), 20 parts of 3,3-dichloro-4,4'-diaminodiphenylmethane (produced by Ihara Chemical Co.) and 75 parts of aluminum powder (average particle size, 44μ), were mixed together and treated in the same manner as in Example 1 thereby to obtain an adhesive composition. The adhesive composition so obtained was evaluated for adhesive strength in the same manner as in Example 1. The results obtained are as indicated in Table 1.

COMPARATIVE EXAMPLE 1

100 parts of tris(4-glycidoxyphenyl)methane (epoxy equivalent, 163; No. of epoxy functional groups, about 3; trademark, XD-7342.00L), 40 parts of 4,4'-diaminodiphenylsulfone (SUMICURE S) and 60 parts of aluminum powder (average particle size, 44μ), were mixed together and treated in the same manner as in Example 1 thereby to obtain a comparative adhesive composition. The comparative composition so obtained was evaluated for adhesive strength in the same manner as in Example 1. The results obtained are as shown in Table 1.

COMPARATIVE EXAMPLE 2

100 parts of tris(4-glycidoxyphenyl)methane (epoxy equivalent, 163; No. of epoxy functional groups, about 3; trademark, XD-7342.00L), 25 parts of an epichlorohydrin.bisphenol A type epoxy resin (epoxy equivalent, 172–176; No. of epoxy functional groups, about 2; produced under the trademark of DER 332 of Dow Chemical Co.), 50 parts of 4,4'-diaminodiphenylsulfone (SUMICURE S) and 75 parts of aluminum powder (average particle size, 44μ), were mixed and treated in the same manner as in Example 1 to obtain a comparative adhesive composition which was then evaluated for adhesive strength in the same manner as in Example 1. The results obtained are as shown in Table 1.

TABLE 1

| Properties | | Example 1 | Example 2 | Example 3 | Example 4 | Com. Example 1 | Com. Example 2 |
|---|---|---|---|---|---|---|---|
| Adhesive strength (Kg/cm$^2$) | Tensile shearing strength (25° C.) | 220 | 180 | 210 | 198 | 178 | 167 |
| | Tensile shearing strength (250° C.) | 175 | 143 | 165 | 141 | 105 | 61 |
| Strength | | 80 | 79 | 79 | 71 | 59 | 37 |

TABLE 1-continued

| | No. | | | | | |
|---|---|---|---|---|---|---|
| Properties | Example 1 | Example 2 | Example 3 | Example 4 | Com. Example 1 | Com. Example 2 |
| retentivity (%) | | | | | | |

EXAMPLE 5

The reaction product (3)(b) used as one of the specific curing agents in this invention may be obtained as illustrated below.

4,4'-diaminodiphenylsulfone (SUMICURE S produced by Sumitomo Chemical Industrial Co.) was used as the aromatic diamine compound. 1,3-divinyltetramethyldisiloxane (commercially available under the trademark of D6210; produced by Chisso Co.) was used, as it was, as the divinylsilane compound. The bismaleimide type compound to be used in this Example was synthesized in accordance with the method described in Example 1 of Japanese Pat. Appln. Laid-Open Gazette 54-68899, 4,4'-diaminodiphenylmethane be used as the amine compound in this synthesis.

A four-necked separable flask provided with a stirrer, thermometer and reflux condenser, was charged with 992 parts of 4,4'-diaminodiphenylsulfone and 716 parts of bismaleimide, after which the whole was stirred at 150° C. while purging with nitrogen. After confirming that the whole was completely in the molten state, 186 parts of 1,3-divinyltetramethyldisiloxane were added to said molten material, vigorously stirred and then made to react thoroughly. The reaction continued for one hour to obtain a reaction product. The reaction product so obtained was deep brown in color and transparent and it had a pour point of not higher than 50° C.

Forty (40) parts of the reaction product so obtained were incorporated with 100 parts of triglycidyl ether of trisphenol (XD-7342.00L produced by Dow Chemical Co.), melt mixed together at 150° C. to completely melt them, and incorporated with 60 parts of aluminum powder (average particle size, 44μ) and then made, after which the aluminum powder was uniformly dispersed in said melted materials thereby to obtain an adhesive composition. The thus obtained composition was measured for tensile shearing strength in the same manner as in Example 1. The results obtained are as shown in Table 2.

EXAMPLE 6

Following the procedure of Example 5, 496 parts of 4,4'-diaminodiphenylsulfone, 534 parts of 3,3'-dichloro-4,4'-diaminodiphenylmethane and 716 parts of bismaleimide, were completely melted and then incorporated with 186 parts of divinyltetramethyldisiloxane, after which the whole was reacted for one hour thereby to obtain a reaction product which was transparent and deep brown in color and had a pour point of not higher than 50° C.

Forty (40) parts of the thus obtained reaction product to be used as a curing agent (3)(b), were incorporated with 100 parts of triglycidyl ether of trisphenol (XD-7342.00L) and melt mixed together at 150° C. After the resulting mixture was completely melted, it was incorporated with 60 parts of aluminum powder (average particle size, 44μ) and the aluminum powder was completely dispersed in the mixture thereby to obtain an adhesive composition. The thus obtained composition was measured for tensile shearing strength and strength retentivity in the same manner as in Example 1. The results obtained are as indicated in Table 2.

EXAMPLE 7

Forty (40) parts of the reaction product (curing agent) synthesized in Example 5 were incorporated with 80 parts of triglycidyl ether of trisphenol (XD-7342.00L) and 20 parts of a cresol novolak type epoxy resin (epoxy equivalent, 222.1; molecular weight, 1600; No. of epoxy functional groups, 7.2; ESCN 220HH; produced by Sumitomo Chemical Industrial Co.), were melt mixed together and then completely melted, after which the thus melted mixture was incorporated with 60 parts of aluminum powder (average particle size, 44μ) and the powder was then completely dispersed in the melted mixture thereby to obtain an adhesive composition. The composition so obtained was measured for tensile shearing strength and strength retentivity in the same manner as in Example 1. The results obtained are as shown in Table 2.

COMPARATIVE EXAMPLE 3

In this Comparative Example, the same 4,4'-diaminodiphenylsulfone and 1,3-divinyltetramethyldisiloxane as used in Example 5 were only used as the starting materials for the synthesis of a curing agent which was a reaction product. The synthesis was effected in bulk as follows.

496 parts of the 4,4'-diaminodiphenylsulfone were introduced into the same separable flask as used in Example 5, completely melted at 150° C. while purging with nitrogen, incorporated with 186 parts of the 1,3-divinyltetramethyldisiloxane and then stirred for one hour to obtain a reaction product (curing agent).

40 parts of the thus obtained reaction product, 100 parts of triglycidyl ether of trisphenol (XD-7342.00L) and 60 parts of aluminum powder (average particle size, 44μ), were mixed and kneaded together to obtain a comparative adhesive composition. The composition so obtained were measured for tensile shearing strength in the same manner as in Example 1. The results are as indicated in Table 2.

COMPARATIVE EXAMPLE 4

A reaction product (curing agent) was obtained by reacting, in bulk, only the same 4,4'-diaminodiphenylsulfone and bismaleimide compound as used in Example 5.

More particularly, 496 parts of the 4,4'-diaminodiphenylsulfone were introduced into the same separable flask as used in Example 5, completely melted at 150° C. while purging with nitrogen, incorporated with 358 parts of the bismaleimide compound and then stirred to react them together for one hour thereby to obtain a reaction product (curing agent) in the semi-gel form at 120° C.

40 parts of the thus obtained reaction product (curing agent), 100 parts of triglycidyl ether of trisphenol (XD-7342.00L) and 60 parts of aluminum powder (average particle size, 44μ), were mixed and kneaded together thereby to obtain a comparative adhesive composition.

The composition so obtained was measured for tensile shearing strength in the same manner as in Example 1. The results obtained are as indicated in Table 2.

COMPARATIVE EXAMPLE 5

Forty (40) parts of the reaction product (curing agent) synthesized in Example 5 were incorporated with 50 parts of triglycidyl ether of trisphenol (XD-7342.00L) and 50 parts of a cresol novolak type epoxy resin (ESCN 220HH), were melt mixed together and then completely melted, after which the thus melted mixture was incorporated with 60 parts of aluminum powder (average particle size, 44μ) and the powder was then completely dispersed in the melted mixture thereby to obtain an adhesive composition. The composition so obtained was measured for tensile shearing strength and strength retentivity in the same manner as in Example 1. The results obtained are as shown in Table 2.

COMPARATIVE EXAMPLE 6

The procedure of Example 5 was followed except that a bifunctional epoxy resin (produced under the trademark of DER 332 by Dow Chemical Co.) was substituted for the cresol novolak type epoxy resin, thereby to obtain a comparative adhesive composition.

The thus obtained comparative composition was measured for tensile shearing strength in the same manner as in Example 5. The results obtained are as shown in Table 2.

TABLE 2

| Properties | | Example 5 | Example 6 | Example 7 | Comp. Example 3 | Comp. Example 4 | Comp. Example 5 | Comp. Example 6 |
|---|---|---|---|---|---|---|---|---|
| Adhesive strength (Kg/cm$^2$) | Tensile shearing strength (25° C.) | 183 | 170 | 240 | 140 | 136 | 302 | 245 |
| | Tensile shearing strength (250° C.) | 177 | 151 | 170 | 40 | 62 | 41 | 37 |
| Strength retentivity (%) | | 97 | 88 | 71 | 30 | 46 | 14 | 15 |

As is seen from the foregoing, the adhesive composition of this invention comprising triglycidyl ether of trisphenol, a polyfunctional epoxy resin, a diamine type curing agent which is an aromatic diamine compound or a reaction product having an amino group at each terminal thereof prepared by reacting together an aromatic diamine compound, divinylsilane compound and bismaleimide compound, and, if desired, a powdery inorganic filler, is a nonsolvent type one having excellent heat resistance and will exhibit its adhesion effect at a comparatively low temperature in a short time when used. Thus, it is very advantageous in operativeness and workability. This indicates that the adhesive composition of this invention finds its use as such not only at the sites where heat resistance is required but also in the wide industrial fields.

What is claimed is:

1. An adhesive composition comprising, by weight (1) 100 parts of triglycidyl ether of trisphenol, (2) 2–40 parts of a polyfunctional epoxy resin and (3) a reaction product having an amino group at each terminal thereof, prepared by reacting together an aromatic diamine compound, a divinyldisiloxane compound and a bismaleimide compound, said reaction product being present in the amount calculated from the following formula, $$\text{parts by weight of the reaction product per 100 parts by weight of the epoxy resin ingredients (1) and (2)} = \frac{\text{Amine equivalent} \times 100 \times \phi}{\text{Epoxy equivalent}}$$

wherein amine equivalent is calculated from the formula $$\frac{\text{Total of parts by weight of aromatic amine, divinyldisiloxane and bismaleimide compounds used}}{\text{No. of active hydrogen atoms bonded to N atom}}$$

and $\phi$ is a value in the range of 0.5 to 2.0.

2. An adhesive composition according to claim 1, further comprising a powdery inorganic filler having an average particle size of 0.1 mμ to 150μ in an amount by weight of 0–200 parts by weight of the epoxy resin type ingredients (1) and (2) in total.

3. An adhesive composition according to claim 2, wherein the amount of powdery inorganic filler is in the range of from 30 to 100 parts by weight.

4. An adhesive composition according to claim 1, wherein the triglycidyl ether of trisphenol is a member selected from tris(4-glycidoxyphenyl)methane, 1,1,2-tris(4-glycidoxyphenyl)ethane and 1,1,3-tris(4-glycidoxyphenyl)propane.

5. An adhesive composition according to claim 1 wherein the aromatic diamine compound is a member selected from 4,4'-diaminodiphenylmethane, 4,4'-diaminodiphenylpropane, benzidine, 3,3-dichlorobenzidine, 4,4'-diphenylsulfide, 3,3'-dichloro-4,4'-diaminodiphenylmethane, 4,4'-diaminodiphenyl ether, 4,4'-diaminodiphenylsulfone, 1,5-diaminoanaphthalenemetaphenylenediamine, paraphenylenediamine, metaphenylenediamine, paraxylylenediamine, metaxylylenediamine and 4,4'-bis(paraaminophenoxy)diphenylsulfone.

6. An adhesive composition according to claim 1 wherein the divinyldisiloxane compound is a member selected from 1,3-divinyltetramethyldisiloxane, 1,3-divinyltetraethoxydisiloxane and 1,3-divinyltetramethyldisiloxane and the bismaleimide compound is a member selected from N,N'-phenylenebismaleimide, N,N'-hexamethylenebismaleimide, N,N'-methylene-di-p-phenylenebismaleimide, N,N'-oxy-di-p-phenylenebismaleimide, N,N'-p-diphenylsulfonmaleimide, N,N'-(3,3'-dimethyl)methylene-di-p-phenylenebismaleimide, N,N'-m(or p)-xylylenebismaleimide and N,N'-metatoluylene-dimaleimide.

7. An adhesive composition according to claim 2 wherein the powdery inorganic filler is a member selected from silica, quartz, glass powder, alumina, calcium silicate, talc, kaolin, aluminum powder and iron powder.

8. The composition according to claim 1 wherein 40 parts of the reaction product from 4,4'-diaminodiphenylsulfone, 1,3-divinyltetramethyldisiloxane and bismaleimide, is mixed with 80 parts of triglycidyl ether of trisphenol and 20 parts of epoxy resin, the mixture is melted and 60 parts of aluminum powder are added to obtain said adhesive composition.

* * * * *